US012677799B1

(12) United States Patent
Ding

(10) Patent No.: US 12,677,799 B1
(45) Date of Patent: Jul. 14, 2026

(54) SELF-CLEANING PET WATER DISPENSER

(71) Applicant: Lelu Intelligent Technology (Yangzhou) Co., Ltd., Yangzhou (CN)

(72) Inventor: Wei Ding, Yangzhou (CN)

( * ) Notice: Subject to any disclaimer, the term of this patent is extended or adjusted under 35 U.S.C. 154(b) by 0 days.

(21) Appl. No.: 19/178,497

(22) Filed: Apr. 14, 2025

(30) Foreign Application Priority Data

Mar. 13, 2025 (CN) .......................... 202520441770.3

(51) Int. Cl.
*A01K 7/02* (2006.01)

(52) U.S. Cl.
CPC .............. *A01K 7/025* (2013.01); *A01K 7/027* (2013.01)

(58) Field of Classification Search
CPC .......... A01K 7/025; A01K 7/027; A01K 7/00; A01K 7/02; B67D 3/00; B67D 3/0083; B67D 1/16; B67D 1/07; Y10T 137/5762
USPC .......................................................... 119/72
See application file for complete search history.

(56) References Cited

U.S. PATENT DOCUMENTS

| | | | | |
|---|---|---|---|---|
| 11,317,604 | B1* | 5/2022 | Pang ....................... | A01K 7/022 |
| 2015/0282453 | A1* | 10/2015 | Rogers ..................... | A01K 7/06 |
| | | | | 119/72 |
| 2018/0064064 | A1* | 3/2018 | Sayag ..................... | A01K 7/025 |
| 2023/0240259 | A1* | 8/2023 | Peng ....................... | C02F 1/283 |
| | | | | 119/72 |
| 2023/0389517 | A1* | 12/2023 | Sikazwe ................ | A01K 7/025 |
| 2023/0397573 | A1* | 12/2023 | Zou .......................... | A01K 7/00 |
| 2025/0234837 | A1* | 7/2025 | Wang ..................... | A01K 7/025 |

* cited by examiner

*Primary Examiner* — Zoe Tam Tran

(57) ABSTRACT

A self-cleaning pet water dispenser, comprising a main body, a clean water tank is detachably arranged on the main body, a wastewater tank is detachably connected to a front side of the main body, a drinking ladle assembly and a water outlet assembly are connected to a front end of the main body and are located above the wastewater tank, the water outlet assembly is communicated with the clean water tank through a water pump, the water outlet assembly comprises a water outlet for filling clean water into the drinking ladle assembly, the drinking ladle assembly is rotatably connected to the water outlet assembly, a drive mechanism is arranged inside the main body, the drinking ladle assembly flips downward under the drive of the drive mechanism and returns to a horizontal position under reverse driving.

8 Claims, 10 Drawing Sheets

SELF-CLEANING PET WATER DISPENSER

1. TECHNICAL FIELD

The invention relates to the technical field of pet water dispensers, in particular to a self-cleaning pet water dispenser.

2. BACKGROUND ART

A pet water dispenser is a device that provides a continuous supply of clean water for household pets such as cats and dogs, maintaining water freshness through a circulation and filtration system. Its main features include circulation filtration, continuous water supply, silent operation, multiple water outlets, and a large-capacity water tank, making it suitable for multi-pet households and long-term use. Common types include electric and non-electric water dispensers. The electric type uses electricity to drive a water pump, making it suitable for pets that require flowing water, while the non-electric type relies on gravity to supply water, with a simple structure and no need for a power source.

Upon investigation, the publication (announcement) number 202321934322.4 discloses a pet water dispenser capable of discarding contaminated water in the drinking basin and replacing it with clean water. However, after a certain period of use, stains can accumulate in the drinking basin, and relying solely on the action of discarding water is ineffective for thorough cleaning. Additionally, the drinking basin cannot be easily removed from the driving component, limiting routine maintenance to only partial wiping. Therefore, the convenience and effectiveness of cleaning need to be improved.

Upon investigation, the publication (announcement) number 202321528973.3 discloses an automatic water-filling, self-cleaning, and waste-disposing pet water dispenser. This dispenser is capable of automatic cleaning, but it requires a large amount of water for rinsing during the cleaning process. Additionally, the cleaning scraper used for cleaning the drinking basin needs regular maintenance, indicating room for improvement in terms of ease of use. Furthermore, the flipping mechanism of the drinking basin and the space required for separate cleaning components are relatively large, contributing to the overall bulkiness of the water dispenser.

In order to solve the above problems, the invention provides a self-cleaning pet water dispenser.

3. SUMMARY OF THE INVENTION

In order to solve the above problems existing in the prior art, the invention provides a self-cleaning pet water dispenser, which has the characteristics of reducing the volume while ensuring the use effect of the drinking basin.

In order to realize the above objects, the invention provides the following technical scheme: a self-cleaning pet water dispenser, comprising a main body, a clean water tank is detachably arranged on the main body, a wastewater tank is detachably connected to a front side of the main body, a drinking ladle assembly and a water outlet assembly are connected to a front end of the main body and are located above the wastewater tank, the water outlet assembly is communicated with the clean water tank through a water pump, the water outlet assembly comprises a water outlet for filling clean water into the drinking ladle assembly, the drinking ladle assembly is rotatably connected to the water outlet assembly, a drive mechanism is arranged inside the main body, the drinking ladle assembly flips downward under the drive of the drive mechanism and returns to a horizontal position under reverse driving.

As a preferred technical scheme of the invention, the drinking ladle assembly comprises a flipping seat and a drinking ladle, the flipping seat is fixedly connected to the drinking ladle, a rear side of the flipping seat is recessed to form a drive space, and within the drive space, there are symmetrically arranged movable clamping seats and rotating shafts.

As a preferred technical scheme of the invention, the water outlet assembly further comprises a water inlet, a water delivery pipe and a connecting portion, the water inlet is connected to the water pump via a pipeline, the water delivery pipe is connected to the water inlet and the water outlet, the connecting portion is provided with axial holes corresponding to the rotating shafts.

As a preferred technical scheme of the invention, a fixing frame is arranged inside the main body, and the drive mechanism comprises a supporting plate mounted horizontally in the fixing frame and a driving motor mounted at a lower end of the fixing frame, a gear is arranged at an output end of the driving motor, a rack meshing with the gear is arranged at a bottom of the supporting plate, and a clamping joint corresponding to the movable clamping seats is arranged at a front end of the supporting plate.

As a preferred technical scheme of the invention, the water outlet assembly is connected to the fixing frame via a locking mechanism, the locking mechanism comprises a shifting block elastically arranged in the fixing frame by a spring, a bottom of the shifting block is integrally formed with a locking block, an upper surface of the water outlet assembly is provided with a locking groove that mates with the locking block.

As a preferred technical scheme of the invention, a bottom of the drinking ladle is fixed with a heating element, and a rear side of the drinking ladle is fixed with a water level sensing element, the flipping seat forms a cover over the heating element and the water level sensing element.

As a preferred technical scheme of the invention, an upper end of the main body is provided with a control panel, and one side of the main body is provided with a clean water tank release button; a battery pack, a circuit board, and the water pump are arranged inside the main body and below the clean water tank; the battery pack is used to power the water pump and the driving motor; the circuit board is electrically connected to the battery pack, the water pump, the driving motor, the heating element, and the water level sensing element, respectively, and coordinates various operations after receiving instructions input from the control panel.

As a preferred technical scheme of the invention, a removable water tank cover is arranged at an upper end of the clean water tank, the water tank cover and the clean water tank are connected via a connecting buckle, and a locking portion corresponding to the clean water tank release button is arranged on one side of the clean water tank.

As a preferred technical scheme of the invention, a filter screen cover is arranged on an upper end of the wastewater tank.

Compared with the prior art, the advantageous effects of the invention are as follows:

1. the hinging of the drinking ladle assembly with the water outlet assembly, combined with the cooperation of the driving mechanism, achieves the flipping and self-cleaning of the drinking ladle; by setting the self-cleaning cycle, regular rinsing of the drinking ladle can be achieved, preventing the breeding of internal bacteria and ensuring the hygiene of pets' drinking water;

2. by installing the water level sensing element, it can detect the amount of water inside the drinking ladle and automatically refill it; additionally, by incorporating a heating element, the water inside the drinking ladle can be heated to a preset temperature; pets drinking heated warm water is more beneficial to their health;

3. by incorporating the locking mechanism, it facilitates the disassembly of the drinking ladle assembly and water outlet assembly for thorough cleaning and maintenance; even if damage occurs, individual parts can be replaced separately, reducing costs.

4. BRIEF DESCRIPTION OF ACCOMPANYING DRAWINGS

The accompanying drawings are used to provide a further understanding of the invention and constitute a part of the specification; together with the embodiments of the invention, they are used to explain the invention and do not constitute a limitation of the invention.

Figure 1:
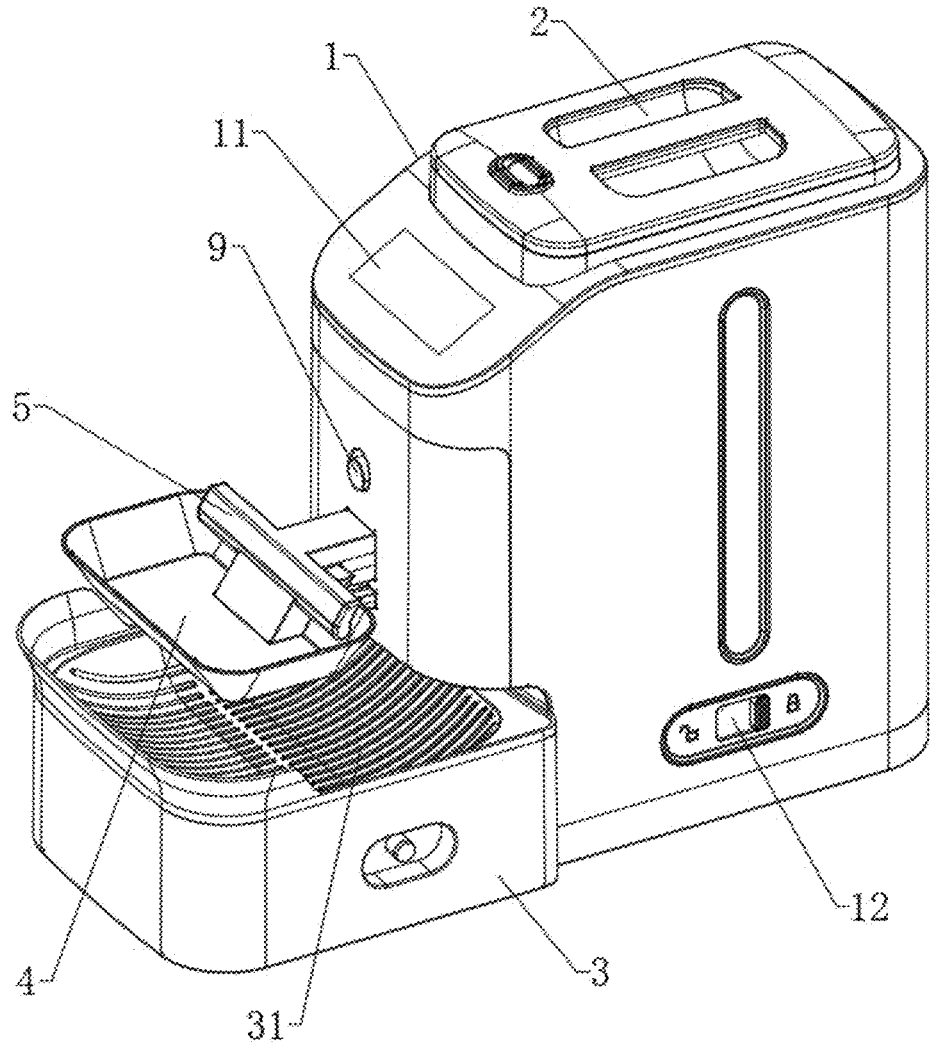
FIG. 1 is a schematic diagram of the overall structure of the invention.
Figure 2:
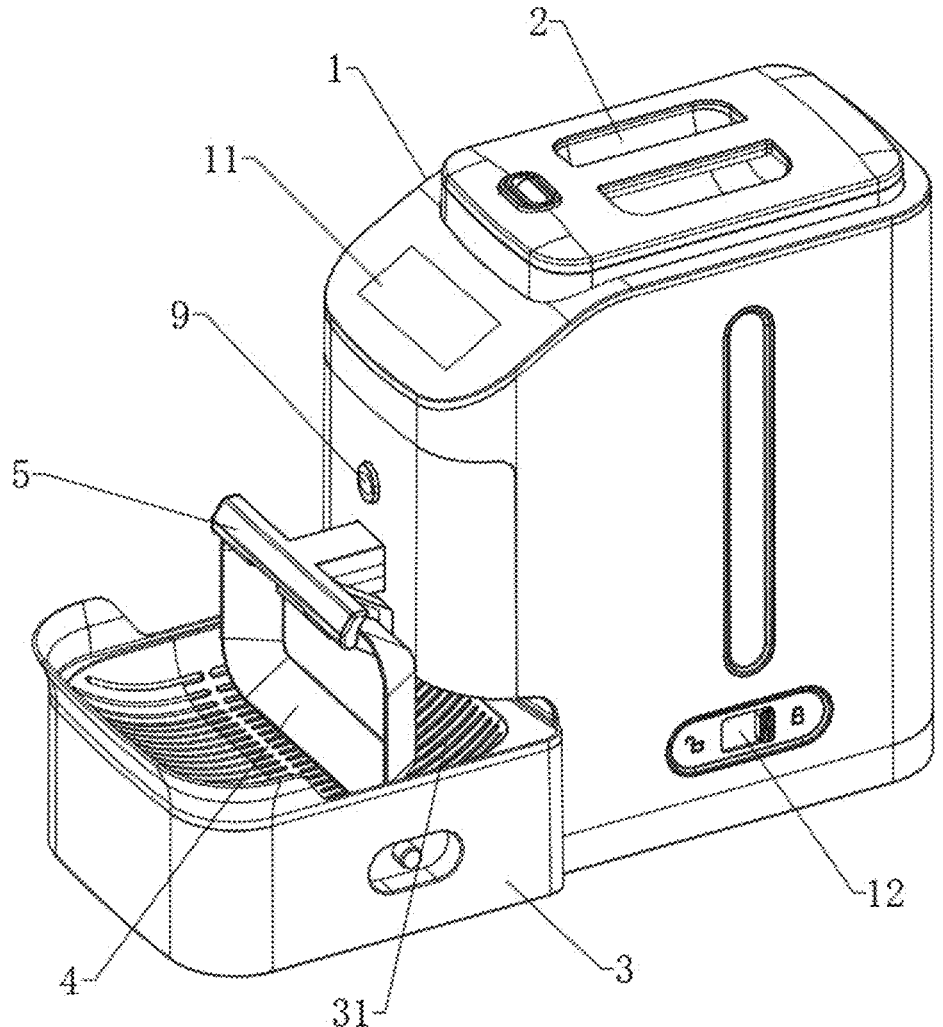
FIG. 2 is a schematic diagram of the structure of the drinking ladle assembly in FIG. 1 after it is turned over.
Figure 3:
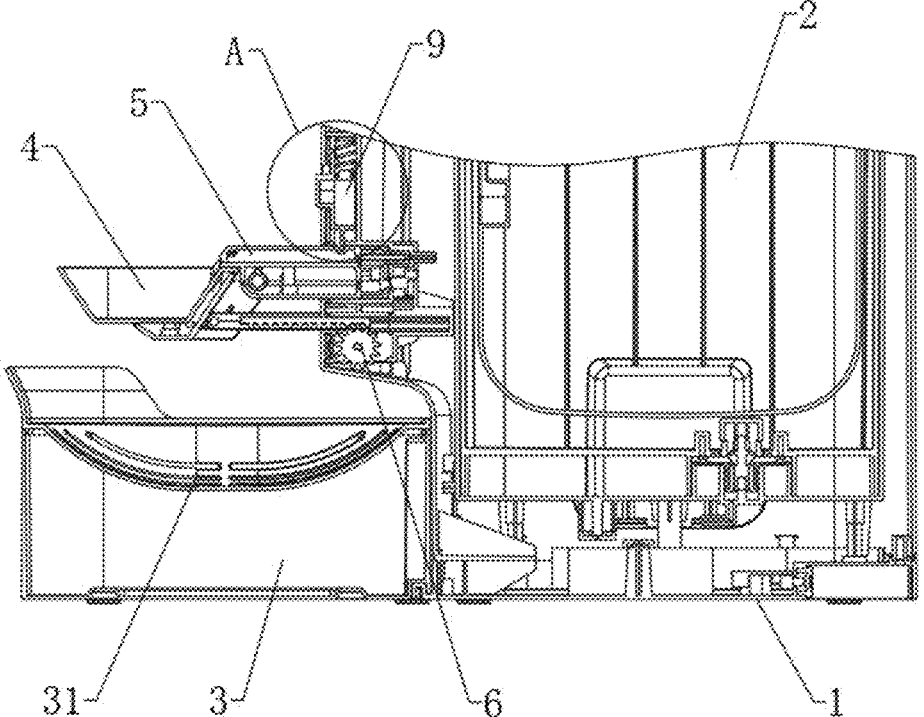
FIG. 3 is a schematic diagram of the structure of the invention in a partially half-sectioned front view.
Figure 4:
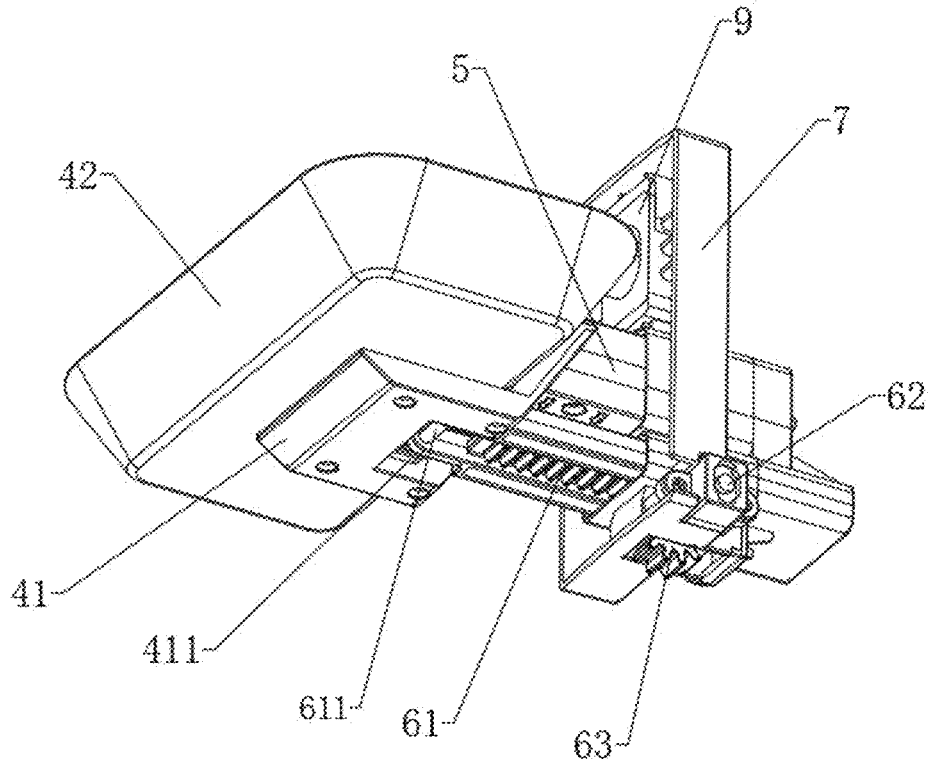
FIG. 4 is a schematic diagram of the structure of the connection between the drinking ladle assembly, the water outlet assembly and the interior of the main body.
Figure 5:
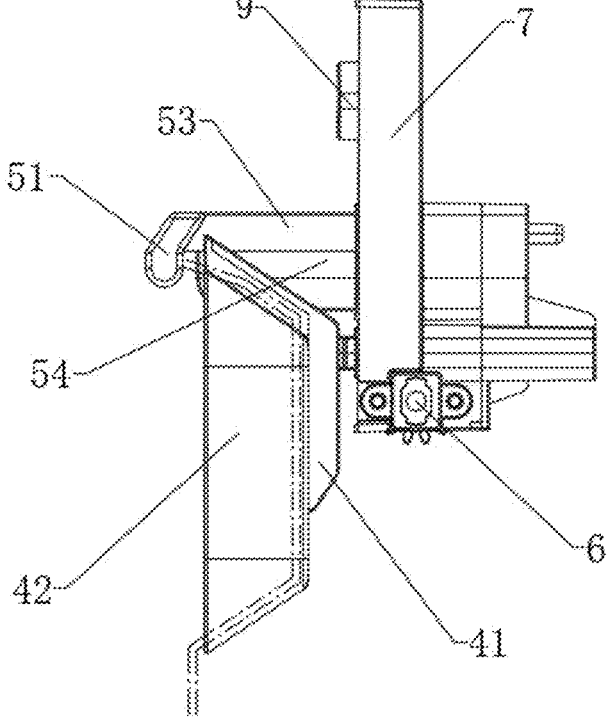
FIG. 5 is a schematic diagram of the self-cleaning of the drinking ladle assembly in FIG. 4 after it is turned over.
Figure 6:
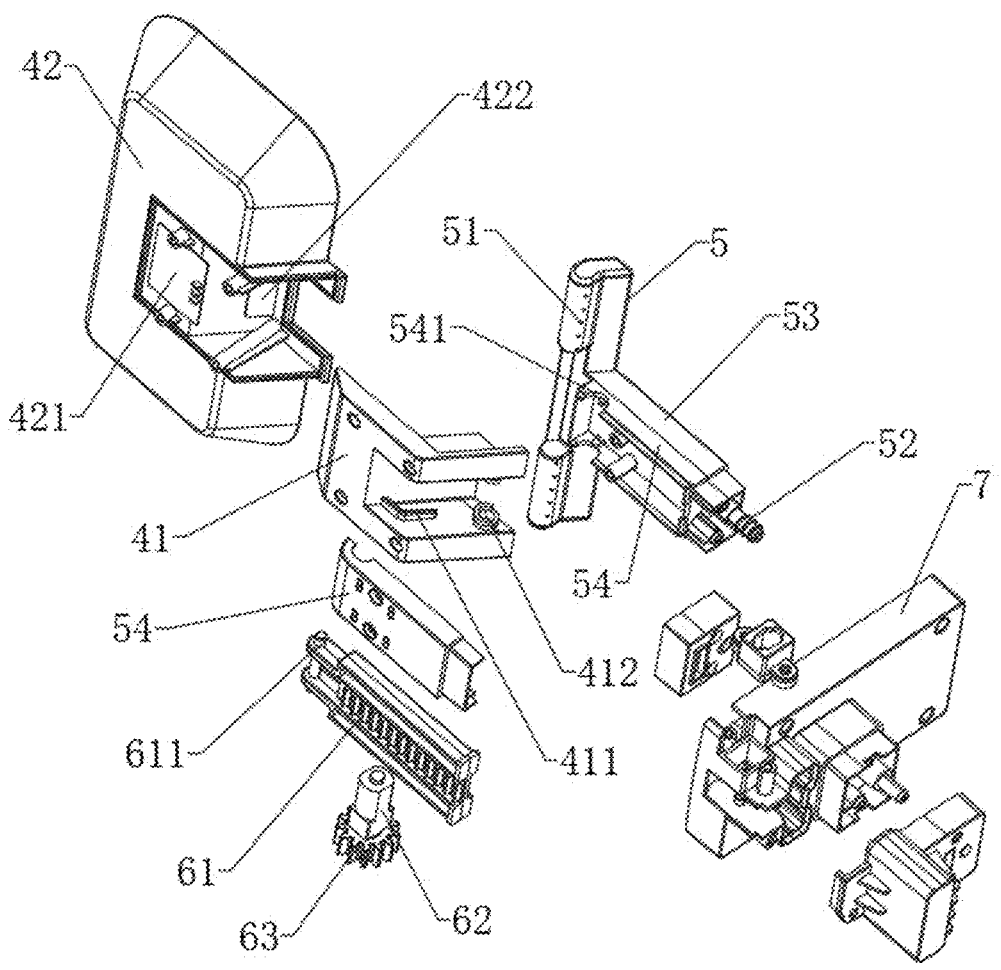
FIG. 6 is a schematic diagram of the split structure of FIG. 4.

In the figures: 1 main body, 11 control panel, 12 clean water tank release button, 13 battery pack, 14 circuit board, 2 clean water tank, 21 water tank cover, 22 connecting buckle, 23 locking portion, 3 wastewater tank, 31 filter screen cover, 4 drinking ladle assembly, 41 flipping seat, 411 movable clamping seat, 412 rotating shaft, 42 drinking ladle, 421 heating element, 422 water level sensing element, 5 water outlet assembly, 51 water outlet, 52 water inlet, 53 water delivery pipe, 54 connecting portion, 541 axial hole, 6 drive mechanism, 61 supporting plate, 611 clamping joint, 62 driving motor, 63 gear, 7 fixing frame, 8 water pump, 9 locking mechanism, 91 spring, 92 shifting block, 93 locking block, 94 locking groove.

5. SPECIFIC EMBODIMENT OF THE INVENTION

The technical schemes in the embodiments of the invention will be clearly and completely described in combination with the accompanying drawings in the embodiments of the invention. Obviously, the described embodiments are only some of the embodiments of the invention, but not all of the embodiments. Based on the embodiments in this invention, all other embodiments obtained by those of ordinary skill in the art without making creative efforts shall fall within the protection scope of this invention.

EMBODIMENT

Please refer to FIG. 1-10, the invention provides a self-cleaning pet water dispenser, comprising a main body 1, a clean water tank 2 is detachably arranged on the main body 1, a wastewater tank 3 is detachably connected to a front side of the main body 1, a drinking ladle assembly 4 and a water outlet assembly 5 are connected to a front end of the main body 1 and are located above the wastewater tank 3, the drinking ladle assembly 4 and the water outlet assembly 5 are arranged roughly horizontally, the water outlet assembly 5 is communicated with the clean water tank 2 through a water pump 8, the water outlet assembly 5 comprises a water outlet 51, the water pump 8 draws clean water from the clean water tank 2 and then fills clean water into the drinking ladle assembly 4 through the water outlet assembly 5, further, the drinking ladle assembly 4 is rotatably connected to the water outlet assembly 5, a drive mechanism 6 is arranged inside the main body 1, the drinking ladle assembly 4 flips downward under the drive of the drive mechanism 6, so that the water stored in the drinking ladle assembly 4 is poured into the wastewater tank 3, and the self-cleaning function is activated for flushing; after completing the self-cleaning, the drinking ladle assembly 4 returns to a horizontal position under the reverse drive of the drive mechanism 6.

Specifically, the drinking ladle assembly 4 comprises a flipping seat 41 and a drinking ladle 42, the flipping seat 41 is fixedly connected to the drinking ladle 42 and is used to support the drinking ladle 42, a rear side of the flipping seat is recessed to form a drive space. Specifically, two opposing inner side walls are formed within the drive space; each of the inner side walls is convexly provided with a movable clamping seat 411 facing towards the interior of the space; one end far from each movable clamping seat 411 is convexly provided with a rotating shaft 412, respectively.

Specifically, the water outlet assembly 5 further comprises a water inlet 52, a water delivery pipe 53 and a connecting portion 54, the water inlet 52 is connected to the water pump 8 via a pipeline, the water delivery pipe 53 is connected to the water inlet 52 and the water outlet 51, the connecting portion 54 is provided with axial holes 541 corresponding to the rotating shafts 412. In this embodiment, the drinking ladle assembly 4 is hingedly connected to the axial holes 541 through the rotating shafts 412, so that it can be rotatably connected to the water outlet assembly 5; a sealing ring is arranged on an outside of the water inlet 52 to ensure a proper seal when the water outlet assembly 5 is axially inserted or removed; spray holes facing the drinking ladle 42 are arranged below the water outlet 51. When the drinking ladle 42 is in the state shown in FIG. 5, the water flowing out of the spray holes rinses an interior of the drinking ladle 42. After the water flows along the dotted path shown in FIG. 5, it is collected by the wastewater tank 3. To ensure thorough cleaning of the drinking ladle 42, multiple spray holes are arranged transversely along the water outlet assembly 5.

Specifically, a fixing frame 7 is arranged inside the main body 1, and the drive mechanism 6 comprises a supporting plate 61 mounted horizontally in the fixing frame 7 and a driving motor 62 mounted at a lower end of the fixing frame 7, a gear 63 is arranged at an output end of the driving motor, a rack meshing with the gear 63 is arranged at a bottom of the supporting plate 61, so that the driving motor 62 can drive the supporting plate 61 to move forward and backward, a clamping joint 611 corresponding to the movable clamping seats 411 is arranged at a front end of the supporting plate 61. The clamping joint 611 engages with the movable clamping seats 411 to drive the rotation of the flipping seat 41. Specifically, when the driving motor 62 drives the supporting plate 61 to move inward into the main body 1, the flipping seat 41 is driven downward by the supporting plate 61. When the driving motor 62 drives the supporting plate 61 to move outward from the main body 1, the flipping seat 41 is pushed horizontally back to its original position by the supporting plate 61. Additionally, when the supporting plate 61 pushes the flipping seat 41 into a horizontal position, it provides support, increasing the structural strength of the drinking ladle assembly 4, making the fitting between the movable clamping seats 411 and the clamping joint 611 easier for assembly and disassembly.

Specifically, the water outlet assembly 5 is connected to the fixing frame 7 via a locking mechanism 9, the locking mechanism 9 comprises a shifting block 92 elastically arranged in the fixing frame 7 by a spring 91, a bottom of the shifting block 92 is integrally formed with a locking block 93, an upper surface of the water outlet assembly 5 is provided with a locking groove 94 that mates with the locking block 93. In this embodiment, the locking mechanism 9 can quickly disassemble the drinking ladle assembly 4 and the water outlet assembly 5 from the main body 1, which is convenient for maintenance and repair, and stable connection.

Specifically, in order to heat the water in the drinking ladle 42, a bottom of the drinking ladle 42 is fixed with a heating element 421, and in order to realize automatic water addition of the drinking ladle 42, a rear side of the drinking ladle 42 is fixed with a water level sensing element 422, the heating element 421 and the water level sensing element 422 are respectively electrically connected to the circuit board 14 inside the main body 1, the flipping seat 41 forms a cover over the heating element 421 and the water level sensing element 422 to prevent electronic components from being exposed to cause safety problems. In this embodiment, the water level sensing element 422 is a capacitive sensing element. When there is no water in the drinking ladle 42, the capacitance value is relatively small. When there is water in the drinking ladle 42, the capacitance value significantly increases. By detecting changes in the capacitance value, the water level can be determined. When the capacitance value exceeds a certain threshold, it indicates that there is water. When the capacitance value falls below a certain threshold, it indicates that the water level is too low or there is no water. When the capacitance value is detected to be below the threshold (i.e., no water or low water level), the circuit board 14 will trigger the water pump 8 to add water to the drinking ladle 42 via the water outlet assembly 5. After adding water, the water level rises, and the capacitance value increases. When the capacitance value reaches the set threshold, the circuit board 14 will stop adding water.

Specifically, an upper end of the main body 1 is provided with a control panel 11, and one side of the main body is provided with a clean water tank release button 12; a battery pack 13, a circuit board 14, and the water pump 8 are arranged inside the main body and below the clean water tank 2; the battery pack 13 is used to power the water pump 8 and the driving motor 62; the circuit board 14 is electrically connected to the battery pack 13, the water pump 8, the driving motor 62, the heating element 421, and the water level sensing element 422, respectively. In this embodiment, the user inputs instructions through the control panel 11 and sends them to the circuit board 14. After receiving the signal instructions, the circuit board 14 coordinates various operations. For example, when the user inputs a heating command, the circuit board 14 activates the heating element 421 to heat the water in the drinking ladle 42 to the set temperature; when the user inputs a manual cleaning command, the circuit board 14 controls the driving motor 62 to move the supporting plate 61 towards the interior of the main body 1, thereby flipping the drinking ladle assembly 4 downwards until the supporting plate 61 cannot move further; at this point, the drinking ladle assembly 4 is in a vertical position, allowing the water to pour out; at the same time, the halting movement of the supporting plate 61 causes the stall current of the driving motor 62 to increase. Upon detecting this increased current, the circuit board 14 immediately activates the water pump 8 to draw water, and the water flows out from the water outlet 51 for rinsing. The rinsing duration is preset. After rinsing stops, the circuit board 14 controls the driving motor 62 to drive the supporting plate 61 to move towards the exterior of the main body 1, thereby pushing the drinking ladle assembly 4 back to its horizontal position. At the same time, when the supporting plate 61 stops moving, the stall current of the driving motor 62 increases; when the circuit board 14 detects this increased current, it will immediately activate the water pump 8 to refill the drinking ladle 42 with water; when the water level sensing element 422 detects that the set threshold for refilling has been reached, water filling stops. When the user inputs an interval for automatic cleaning, the circuit board 14 controls the repetition of the aforementioned manual cleaning process at the predetermined time interval.

Specifically, a removable water tank cover 21 is arranged at an upper end of the clean water tank 2, the water tank cover 21 and the clean water tank 2 are connected via a connecting buckle 22, and a locking portion 23 corresponding to the clean water tank release button 12 is arranged on one side of the clean water tank 2. In this embodiment, a sealing gasket is arranged at a connection between the water tank cover 21 and the clean water tank 2. The connecting buckle 22 connects the water tank cover 21 to the clean water tank 2 through a spring-assisted insertion mechanism. The water tank cover 21 is equipped with a handle for easy opening of the water tank cover 21 on the clean water tank 2. The locking portion 23 is locked by a horizontally movable clean water tank release button 12 and a spring. By flipping the clean water tank release button 12 to disengage it from the locking portion 23, the clean water tank 2 can be taken out from the main body 1 separately, facilitating maintenance and replacement. Furthermore, the interior of the clean water tank 2 is equipped with the water level sensing element connected to the circuit board 14, such as a Hall effect sensor switch. When insufficient water is sensed, it prompts the user to add water. Since this is well-known technology in the field, further elaboration is omitted herein.

Specifically, a filter screen cover 31 is arranged on an upper end of the wastewater tank 3. The filter screen cover 31 can be placed on or attached to the upper end of the wastewater tank 3 through a snap-fit connection, preventing internal wastewater from splashing out and simultaneously preventing pets from drinking the wastewater. In this embodiment, the wastewater tank 3 is detachably connected to the main body 1 through a snap-fit mechanism, ensuring a stable connection while also facilitating the dumping of internal wastewater. Part of the wastewater tank 3 is embedded in a lower part of the main body 1, making the overall structure more compact. Furthermore, an interior of the wastewater tank 3 is also provided with the water level sensing element connected to the circuit board 14, such as a Hall effect sensor switch. When it senses that the water is full, it can prompt the user to clean it. This is also well-known technology in the field and will not be elaborated further herein.

The working principle and usage process of the invention: when the control panel 11 indicates that the clean water tank 2 has insufficient water, the water tank cover 21 is taken out from the clean water tank 2 by disengaging the connecting buckle 22. Water is then added to the clean water tank 2, and finally, the water tank cover 21 is secured back onto the clean water tank 2 by fastening the connecting buckle 22.

As shown in FIG. 1, this is a normal operating state of the water dispenser. At this point, the locking mechanism 9 is in a locked state, and the drinking ladle 42 is positioned horizontally. The heating element 421 can heat the water in the drinking ladle 42 through the control panel 11. The water level sensing element 422 detects the water level inside the drinking ladle 42 by the change in capacitance, and auto-matically adds water when the set level is reached.

The interval for self-cleaning can be set through the control panel 11. When the set time is reached, the circuit board 14 controls the drinking ladle assembly 4 to flip downwards, pouring the retained water into the wastewater tank 3; subsequently, it controls the water outlet assembly 5 to spray water to rinse the interior of the drinking ladle 42; after rinsing stops, it controls the drinking ladle assembly 4 to reset to its horizontal position; then, it controls the water outlet assembly 5 to add water to the drinking ladle 42 until the set threshold of the water level sensing element 422 is reached, at which point water addition stops.

When the control panel 11 indicates that the wastewater tank 3 is full, the wastewater tank 3 can be taken out to empty the internal wastewater.

Figure 7:
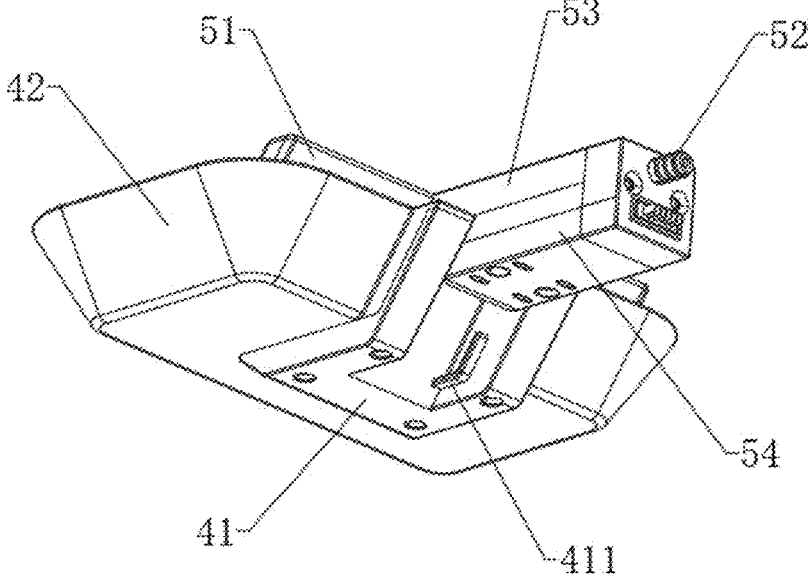
FIG. 7 is a schematic diagram of the structure after the drinking ladle assembly and the water outlet assembly are removed as a whole.
Figure 8:
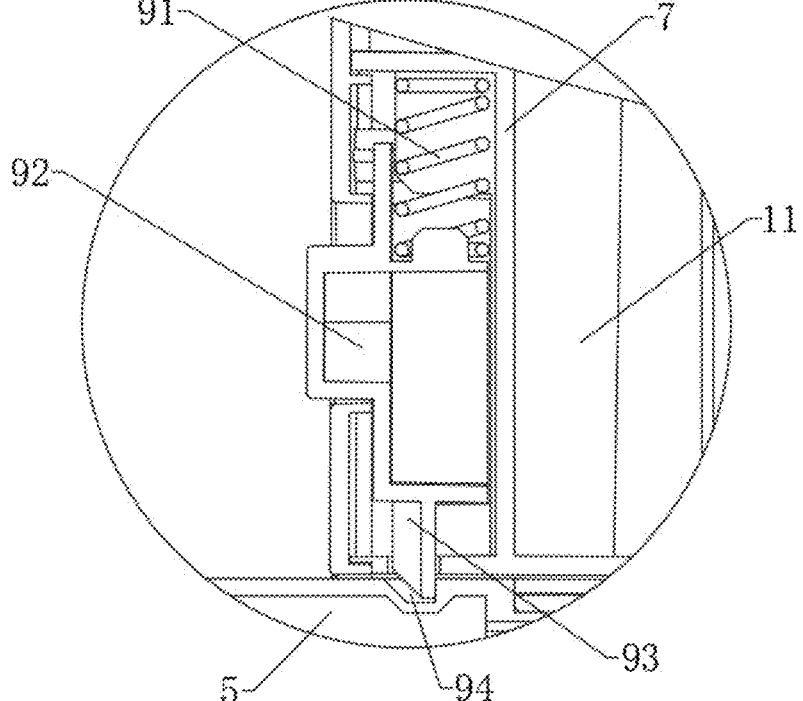
FIG. 8 is an enlarged schematic diagram of the structure of part A in FIG. 3.
Figure 9:
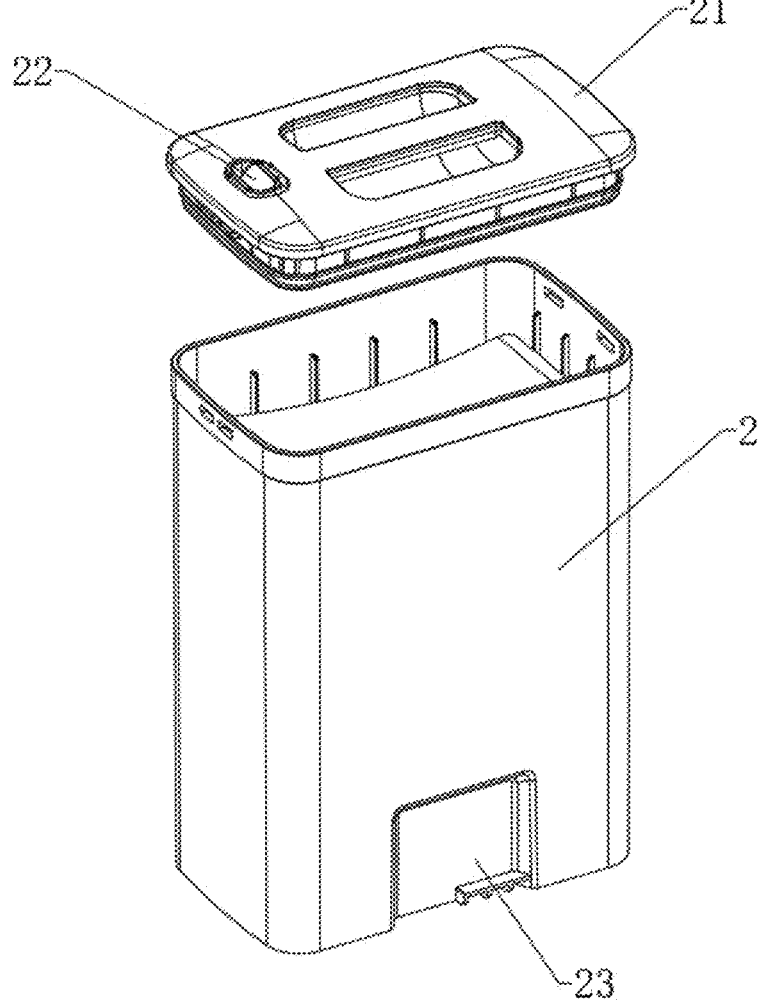
FIG. 9 is a schematic diagram of the structure of the clean water tank.
Figure 10:
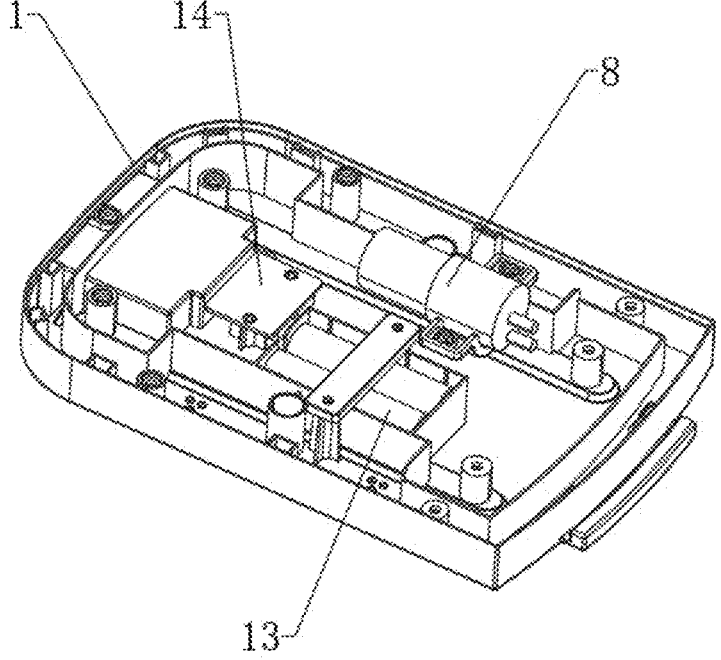
FIG. 10 is an enlarged schematic diagram of the structure of the internal components of the main body directly below the clean water tank.

Disassembly and assembly of the drinking ladle assembly 4 and the water outlet assembly 5: by pushing the shifting block 92 upward, the locking block 93 disengages from the locking groove 94, compressing the spring 91; then, the drinking ladle assembly 4 and the water outlet assembly 5 are pulled out horizontally. At this point, it is necessary to ensure that the water and electrical connectors are safely detached. As shown in FIG. 7, this is a disassembled part, allowing for deep cleaning, maintenance, or replacement of the drinking ladle assembly 4 and the water outlet assembly 5. During installation, the water outlet assembly 5 is par-tially inserted into the fixing frame 7, then the movable clamping seats 411 is engaged with the clamping joint 611, and then the water outlet assembly 5 is fully inserted, completing connection of the water and electrical connec-tors, and the locking mechanism 9 locks the drinking ladle assembly 4 and the water outlet assembly 5 in place.

Finally, it should be noted that the above is only a preferred embodiment of the invention and is not intended to limit the invention. Although the invention is described in detail with reference to the above embodiments, technicians in this field can still modify the technical solutions recorded in the above embodiments, or replace some of the technical features with equivalents. Any modification, equivalent replacement, improvement, etc. made within the spirit and principle of the invention shall be included in the protection scope of the invention.

The invention claimed is:

1. A self-cleaning pet water dispenser, comprising a main body, a clean water tank is detachably arranged on the main body, a wastewater tank is detachably connected to a front side of the main body, a drinking ladle assembly and a water outlet assembly are connected to a front end of the main body and are located above the wastewater tank, the water outlet assembly is communicated with the clean water tank through a water pump, the water outlet assembly comprises a water outlet for filling clean water into the drinking ladle assembly, the drinking ladle assembly is rotatably connected to the water outlet assembly, a drive mechanism is arranged inside the main body, the drinking ladle assembly flips downward under the drive of the drive mechanism and returns to a horizontal position under reverse driving;

wherein the drinking ladle assembly comprises a flipping seat and a drinking ladle, the flipping seat is fixedly connected to the drinking ladle, a rear side of the flipping seat is recessed to form a drive space, and within the drive space, there are symmetrically arranged movable clamping seats and rotating shafts.

2. The self-cleaning pet water dispenser of claim 1, wherein the water outlet assembly further comprises a water inlet, a water delivery pipe and a connecting portion, the water inlet is connected to the water pump via a pipeline, the water delivery pipe is connected to the water inlet and the water outlet, the connecting portion is provided with axial holes corresponding to the rotating shafts.

3. The self-cleaning pet water dispenser of claim 1, wherein a fixing frame is arranged inside the main body, and the drive mechanism comprises a supporting plate mounted horizontally in the fixing frame and a driving motor mounted at a lower end of the fixing frame, a gear is arranged at an output end of the driving motor, a rack meshing with the gear is arranged at a bottom of the supporting plate, and a clamping joint corresponding to the movable clamping seats is arranged at a front end of the supporting plate.

4. The self-cleaning pet water dispenser of claim 3, wherein the water outlet assembly is connected to the fixing frame via a locking mechanism, the locking mechanism comprises a shifting block elastically arranged in the fixing frame by a spring, a bottom of the shifting block is integrally formed with a locking block, an upper surface of the water outlet assembly is provided with a locking groove that mates with the locking block.

5. The self-cleaning pet water dispenser of claim 1, wherein a bottom of the drinking ladle is fixed with a heating element, and a rear side of the drinking ladle is fixed with a water level sensing element, the flipping seat forms a cover over the heating element and the water level sensing ele-ment.

6. The self-cleaning pet water dispenser of claim 5, wherein an upper end of the main body is provided with a control panel, and one side of the main body is provided with a clean water tank release button; a battery pack, a circuit board, and the water pump are arranged inside the main body and below the clean water tank; the battery pack is used to power the water pump and the driving motor; the circuit board is electrically connected to the battery pack, the water pump, the driving motor, the heating element, and the water level sensing element, respectively, and coordinates various operations after receiving instructions input from the control panel.

7. The self-cleaning pet water dispenser of claim 6, wherein a removable water tank cover is arranged at an upper end of the clean water tank, the water tank cover and the clean water tank are connected via a connecting buckle, and a locking portion corresponding to the clean water tank release button is arranged on one side of the clean water tank.

8. The self-cleaning pet water dispenser of claim 1, wherein a filter screen cover is arranged on an upper end of the wastewater tank.

\* \* \* \* \*